United States Patent Office 2,939,858
Patented June 7, 1960

2,939,858

LIGHT RESISTANT COPOLYMER OF POLY(ALKYLENE - MALEATE - HEXAHYDRO ORTHOPHTHALATE) AND STYRENE

William Cummings, North Woodbury, Conn., assignor to United States Rubber Company, New York, N.Y., a corporation of New Jersey No Drawing. Filed Aug. 16, 1957, Ser. No. 678,523

5 Claims. (Cl. 260—45.4)

This invention relates to improvements in the production of light resistant polyester resin compositions and to the resulting products.

This application is a continuation-in-part of application Serial No. 481,479, filed January 12, 1955, now abandoned.

Many unsaturated fusible alkyds (polyesters) when cross-linked with ethylenic ($CH_2=C<$) compounds provide cured infusible resins that, if they have the necessary tensile strength, lack the required light resistant properties, or vice versa. In both regards, the unsaturated alkyd component is a controlling factor, especially in preventing yellowing on exposure to light such as sunlight (actinic rays).

An object of this invention is to provide an unsaturated alkyd which will enable the production of a satisfactory light resistant resin composition, on cure. Other objects will be apparent from the hereinafter description.

I have found such an alkyd can be prepared by heating, at 170–210° C., an acid mix composed of maleic acid preferably in the form of the anhydride and hexahydrophthalic acid which is the cyclohexane-1,2-dicarboxylic acid, preferably in the form of the anhydride in the molar ratio, respectively, extending from 0.6:0.4 to 0.4:0.6, together with about one mole of a glycol such as ethylene glycol, propylene glycol, 1,3-butylene glycol, 1,4-butylene glycol, or diethylene glycol. When cross-linked (copolymerized) with a copolymerizable ethylenic compound such as styrene or vinyl toluene (o-, m-, or p- or mixture thereof), the resulting cured resin has been found to possess extraordinary resistance to yellowing by light.

The following examples, in which the parts are by weight, are given to illustrate the invention.

EXAMPLE 1

All of the unsaturated alkyds listed in Table I were prepared by heating a mixture of glycol (2.14 moles) and the anhydride of cyclohexane-1,2-dicarboxylic acid (0.8–1.2 moles), M.P. about 35° C., to 100° C. with stirring under a blanket of carbon dioxide. At this point maleic anhydride (1.2–0.8 mole) was added. The temperature was raised to 170–180° C. and held there one hour after which the reaction was continued at 190–200° C. until the acid number had dropped to a range of 10–60, preferably to 45–50. The batch was then cooled to 120° C. and hydroquinone (100 p.p.m. on resin) was added. When the temperature reached 95–105° C., sufficient styrene was added to constitute 30% by weight of the final composition. The blending was carried out under a carbon dioxide atmosphere with stirring.

Generally, the cross-linking agent may range, by weight, from 20–50%, and preferably 25–35%.

Castings were prepared by stirring the resin with 0.6% methyl ethyl ketone peroxide. The catalyzed resin was poured into a mold consisting of two glass plates separated by a ¼" thick rubber gasket and held together with spring clips. The resin was cured by heating 2 hours at 70° C. and 1½ hours at 110° C.

Table I

PROPERTIES OF POLY(PROPYLENE MALEATE CYCLOHEXANE-1,2-DICARBOXYLATE)-STYRENE RESINS

| | A | B | C | D | E |
|---|---|---|---|---|---|
| Casting: Maleic anhydride/cyclohexane-1,2-dicarboxylic anhydride—mole ratio | 0.7/0.3 | 0.6/0.4 | 0.5/0.5 | 0.4/0.6 | 0.3/0.7 |
| Tensile (p.s.i.) | 5,500 | 8,300 | 10,000 | 9,200 | 3,100 |
| Elongation, percent | 5.2 | 2.4 | 3.4 | 2.4 | 0.3 |
| Hardness (Rockwell L scale) | 98 | 115 | 115 | 114 | 110 |
| Discoloration after 400 hours exposure to RS sunlamp | Disc. | Clear | Clear | Clear | Disc. |

EXAMPLE 2

A mixture of 1,3-butylene glycol (2.06 moles), cyclohexane-1,2-dicarboxylic anhydride (1.0 mole), and maleic anhydride (1.0 mole) was stirred and heated to 160° C. under a blanket of $CO_2$. Heating and stirring was continued at 160–170° C. for 1 hour after which the reaction was continued at 190–200° C. until the acid number had dropped to 45. The batch was cooled to 160° C. and 75 p.p.m. of hydroquinone (based on total resin) was added. The batch was further cooled to 110° C. and blended with enough styrene to produce a 30% styrene solution.

Castings were prepared by stirring the resin with 0.6% methyl ethyl ketone peroxide. The catalyzed resin was poured into a mold as in Example 1. The resin was cured 1 hour at 60° C., 1 hour at 70° C., and 1½ hours at 110° C.

The resulting cured resin had the following properties:

Tensile (p.s.i.) _____ 7400
Elongation, percent _____ 3.5
Hardness:
   (Rockwell L scale) _____ 106
   (Rockwell M scale) _____ 88
24 hour water absorption, percent _____ 0.26

This resin was significantly better than any of the resins of Example 1 in resistance to ultraviolet light and to Florida sunlight.

It will be apparent that resins in which the maleic acid cyclohexane-1,2-dicarboxylic acid ratio lies outside the range 0.6:0.4–0.4:0.6 are lacking in one or more properties which must be present to provide maximum utility. If the maleic acid is increased beyond 0.6 mole the discoloration is unsatisfactory. If the maleic acid is decreased to 0.3 mole the tensile strength of the resin drops off.

Having thus described my invention, what I claim and desire to protect by Letters Patent is:

1. A light resistant resinous copolymer consisting of an unsaturated polyester which is a poly (alkylene maleate-hexahydro ortho-phthalate) in which the molar ratio of combined maleic acid anhydride to the hexahydro ortho-phthalic acid anhydride ranges from 0.6:0.4 to 0.4:0.6, and a single cross-linking agent which is a monoethylenic compound copolymerizable with said polyester, said cross-linking agent being selected from the group consisting of styrene and vinyl toluene, the amount of said cross-linking agent being equal to from 25 to 35% by weight of the sum of said polyester and said cross-linking agent.

2. A light resistant resinous copolymer consisting of an unsaturated polyester which is a poly (alkylene maleate-hexahydro ortho-phthalate) in which the molar ratio of combined maleic acid anhydride to the hexahydro ortho-phthalic acid anhydride ranges from 0.6:0.4 to 0.4:0.6, and styrene as a cross-linking agent, the amount of styrene being equal to from 25 to 35% by weight of the sum of said polyester and said styrene.

3. A light resistant resinous copolymer consisting of an unsaturated polyester which is poly (1,3-butylene maleate-hexahydro ortho-phthalate) in which the molar ratio of combined maleic acid anhydride to the hexahydro ortho-phthalic acid anhydride ranges from 0.6:0.4 to 0.4:0.6, and styrene as a cross-linking agent, the amount of styrene being equal to from 25 to 35% by weight of the sum of said polyester and said styrene.

4. A light resistant resinous copolymer consisting of an unsaturated polyester which is poly (propylene maleate-hexahydro ortho-phthalate) in which the molar ratio of combined maleic acid anhydride to the hexahydro ortho-phthalic acid anhydride ranges from 0.6:0.4 to 0.4:0.6, and styrene as a cross-linking agent, the amount of styrene being equal to from 25 to 35% by weight of the sum of said polyester and said styrene.

5. A light resistant resinous copolymer consisting of an unsaturated polyester which is a poly (butylene maleate-hexahydro ortho-phthalate) in which the molar ratio of combined maleic acid anhydride to the hexahydro ortho-phthalic acid anhydride ranges from 0.6:0.4 to 0.4:0.6, and styrene as a cross-linking agent, the amount of styrene being equal to from 25 to 35% by weight of the sum of said polyester and said styrene.

References Cited in the file of this patent
UNITED STATES PATENTS

| | | |
|---|---|---|
| 2,340,109 | D'Alelio | Jan. 25, 1944 |
| 2,428,788 | D'Alelio | Oct. 14, 1947 |
| 2,794,785 | D'Alelio | June 4, 1957 |